Patented Mar. 22, 1932

1,850,556

UNITED STATES PATENT OFFICE

CARL LUDWIG LAUTENSCHLÄGER, OF FRANKFORT-ON-THE-MAIN, GERMANY, ASSIGNOR TO WINTHROP CHEMICAL COMPANY, INC., OF NEW YORK, N. Y., A CORPORATION OF NEW YORK

PREPARATIONS HAVING AN ACTION LIKE TUBERCULIN AND PROCESS FOR PRODUCING THEM

No Drawing. Application filed February 3, 1928, Serial No. 251,761, and in Germany February 11, 1927.

The present invention relates to preparations having tuberculin-like action and to a process for producing them.

The tuberculin preparations hitherto used in the therapy and diagnosis of tuberculosis contain to a more or less great extent albumin and albumin degradation-products, salts and other impurities arising from the bacteria or from the nutrient-media solutions employed for the cultivation of the bacteria. As is known, these substances, which are to be regarded as being per se non-specific, may positively favor the cutaneous reaction used in the treatment of tuberculosis or induce one to assume the existence of a positive reaction, which, of course, renders the value of the reaction very doubtful. Moreover, the said substances may when used in therapy produce objectionable secondary effects which unfavorably affect the desired proper action of the tuberculin. Therefore, it is of great importance from a diagnostic and therapeutic point of view to use tuberculin preparations, i. e. preparations of tuberculin-like action, which are largely free from the said non-specific substances.

As a result of my researches on the subject, I have found that the efficacy of tuberculin preparations of any origin is not at all or only slightly impaired if the preparations are treated with agents such as are usually employed for eliminating albumin, for instance ferric dialysate, lead salts or the like, but that only the albumins and their cleavage products are precipitated. The solutions thus treated contain the active constituents of the tuberculins and no longer show any biuret reaction. I have furthermore found that the active substances contained in the albumin-free solutions can be further purified, and thus the active substances isolated, by treating the solutions with acetone, an alcohol or another solvent in which the active substances are insoluble, or by separating at first the active substances by means of a precipitant belonging to the group of alkaloid reagents and freeing the resulting precipitates from the precipitating agent by subsequent decomposition.

The following examples serve to illustrate my invention, but they are not intended to limit it thereto:

1. 20 grams of human dry tuberculin, prepared from a broth by means of a precipitation with alcohol, are dissolved in 50 times the quantity of distilled water and to the solution is added ferric dialysate until there can no longer be traced any albumin in the filtrate or the biuret reaction. From the concentrated filtrate the active substances are precipitated by means of an aqueous solution of picric acid whereupon the resulting tuberculin precipitate is filtered by suction and decomposed with water to which some hydrochloric acid has been added. From the resulting solutions the active substances are precipitated with acetone. Instead of dry tuberculin there may be used as starting material a corresponding quantity of old tuberculin "Koch".

2. 20 grams of bovine tubercle acid, produced by the extraction of bovine tuberclebacilli freed from fat and wax, are dissolved in 50 times the quantity of distilled water and the solution is deprived from albumins by means of lead acetate. The resulting filtrate is freed from any lead by means of hydrogen-sulfide in order to remove therefrom any small quantity of lead salt which may still be contained therein, whereupon the filtrate is precipitated with acetone in order to isolate the active constituents.

3. 50 grams of killed tubercule bacilli are extracted with alcohol and the alcoholic solution is evaporated in a vacuum. The residual mass, which besides the tubercule fats still contains a copious quantity of tuberculin, is extracted with water and the resulting aqueous solution is freed from the ballast substances in the manner indicated in Example 2.

It is to be understood that, for the purpose of this invention, the isolation of the albumen-free active substance by treatment of its solution with a solvent in which the said active substance is insoluble is equivalent to the procedure involving the treatment of said solution with an alkaloid precipitant of the picric acid type.

I claim:

1. The process of producing preparations having tuberculin-like action which comprises adding ferric dialysate to an aqueous solution of tuberculin prepared from tubercle bacilli until albumin can no longer be detected in the filtrate therefrom, isolating the active substance from the filtered albumen-free solution by means of a precipitant, and separating the precipitated substance from the precipitant.

2. The process of producing preparations having tuberculin-like action which comprises adding ferric dialysate to an aqueous solution of tuberculin obtained by extracting tubercle bacilli with alcohol, separating the alcoholic solution from the bacilli, evaporating the solution in a vacuum, and extracting the residue with water, the ferric dialysate being added until albumin can no longer be detected in the filtrate therefrom, isolating the active substance from the filtered albumin-free solution by means of picric acid and separating the precipitated products from the precipitant.

3. As a new product, a preparation from tubercle bacilli having a tuberculin-like action and being substantially free from albumin and iron.

In testimony whereof, I affix my signature.

CARL LUDWIG LAUTENSCHLÄGER.